United States Patent [19]

Vermeulen

[11] E Patent Number: Re. 32,916

[45] Reissued Date of Patent: May 2, 1989

[54] METHOD FOR TRANSPORTING A WEFT THREAD THROUGH A WEAVING SHED AND A LOOM FOR PERFORMING SAID METHOD

[76] Inventor: Geert Jan Vermeulen, Stationsstraat 28, NL-6245 AD Eijsden, Netherlands

[21] Appl. No.: 325,274

[22] Filed: Nov. 27, 1981

Related U.S. Patent Documents

Reissue of:

[64] Patent No.: 3,705,608
Issued: Dec. 12, 1972
Appl. No.: 83,177
Filed: Oct. 22, 1970

[51] Int. Cl.[4] ..... D03D 47/30
[52] U.S. Cl. ..... 139/435
[58] Field of Search ..... 139/435

[56] References Cited

U.S. PATENT DOCUMENTS

| | | | |
|---|---|---|---|
| 3,124,167 | 3/1964 | Te Strake | 139/435 |
| 3,139,118 | 6/1964 | Svaty et al. | 139/435 |
| 3,162,215 | 12/1964 | Saito | 139/435 |
| 3,181,571 | 5/1965 | Scheffel | 139/435 |
| 3,229,725 | 1/1966 | Saito | 139/435 |
| 3,465,791 | 9/1969 | Mullekom | 139/435 |
| 3,818,952 | 6/1974 | Vermeulen et al. | 139/435 |

FOREIGN PATENT DOCUMENTS

| | | | |
|---|---|---|---|
| 733791 | 5/1966 | Canada | 139/435 |
| 1535454 | 2/1963 | Fed. Rep. of Germany | 139/435 |
| 12266 | 2/1963 | Japan | 139/435 |
| 29651 | 4/1964 | Japan | 139/435 |
| 2031958 | 4/1980 | United Kingdom | 139/435 |

*Primary Examiner*—Henry S. Jaudon
*Attorney, Agent, or Firm*—Burns, Doane, Swecker & Mathis

[57] ABSTRACT

A method and apparatus for transporting a weft thread through a weaving shed, by discharging a plurality of aligned jets of transport fluid at points spaced along the shed, the jets being energized successively, in time with the advancement of the leading end of the weft thread, to cause the jets to entrain the leading end of the weft thread progressively and thereby draw the weft thread through the shed.

12 Claims, 1 Drawing Sheet

METHOD FOR TRANSPORTING A WEFT THREAD THROUGH A WEAVING SHED AND A LOOM FOR PERFORMING SAID METHOD

Matter enclosed in heavy brackets [ ] appears in the original patent but forms no part of this reissue specification; matter printed in italics indicates the additions made by reissue.

The invention relates to a method for inserting a weft thread into a weaving shed using a plurality of jet nozzles for supplying a transport fluid arranged spaced along the width of the shed. The invention also relates to a loom of the type in which the wefts are transported through the shed by means of a plurality of jet nozzles for supplying transport fluid arranged spaced along the width of the shed.

Various weaving defects have been found to result in looms of the said type from the conduct of the wefts during their transport through the shed. Among them are weaving defects resulting from the tendency of the wefts to lodge themselves in the boundary layer surrounding each jet cone issued by each separate jet nozzle. Further by all kinds of causes e.g. by cushion building of the transport fluid in the shed, deviations of the wefts may occur whereby the above mentioned weaving defects may be originated.

SUMMARY OF THE INVENTION

The present invention aims at contributing to avoiding the above mentioned weaving defects and the invention is directed to an improvement in the energy transmission from the transport fluid to the thread moving through the shed.

Extensive experiments have shown that the energy transmission from a conical or differently shaped jet is greatest during the period in which the jet cone is adjusting itself and therefore during a period in which the forming of the boundary layer is still in full swing. Where the nature of the jet cone varies less in function of time the energy transmission and therefore the force applied to the thread becomes smaller.

Using this principle the invention proposes to energize the jet nozzles successively or in successive groups in time with the advancement of the leading end of a weft thread through the shed. It appears that the energy transmission is improved thereby in such a way that the increased force acting upon front thread end which force under the improved circumstances acts continuously on said thread end is already able by itself to cause the weft to be transported through the shed at the desired high velocity. Therefore according to a further feature of the invention the supply of the transport fluid to each jet nozzle or to each group of jet nozzles respectively is interrupted or at least decreased as soon as the weft has arrived in the influence area of the next jet nozzle or the next group of jet nozzles respectively. Not only is the total consumption of transport fluid by the different jet nozzles thus reduced to a fraction of the consumption as heretofore present in looms of the type mentioned, but the weft also tends to proceed according to a more tautly extending path than if the jet nozzles or groups of jet nozzles already passed by the front end of the thread would continue to inject fluid and thereby would continue to act on intermediately situated points of the thread. Further said interruption of the supply to the jet nozzles opens the possibility of applying higher pressures, at least in the jet nozzles arranged at the entrance of the shed, than heretofore was acceptable in view of the danger of saturation of the shed and the possibility of cushion building.

Preferably the supply of the transport fluid to a jet nozzle or to a group of jet nozzles is opened before the supply of the preceding jet nozzle or the preceding group of jet nozzles is terminated or reduced in order to obtain a certain overlap by which any variations in the point of time in which the thread is launched by the launching device of the loom are compensated.

DESCRIPTION OF THE PREFERRED EMBODIMENTS

Figure 1:
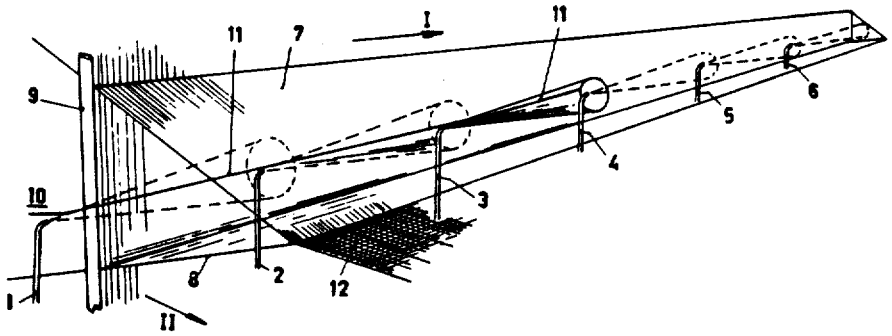
FIG. 1 is a perspective view of a weaving shed with a plurality of schematically shown jet nozzles therein.

FIG. 1 shows schematically an arrangement known per se of a plurality of jet nozzles 1–6 which at least with their outflow openings extend into the shed outlined by the upper warp sheet 7, the under warp sheet 8 and the reed 9. The jet nozzles 1–6 serve to transport the weft 11 launched at 10 in the direction of the arrow 1 through the shed shown whereafter the reed 9 is moved in the direction of the arrow 11 in order to beat up into the cloth the weft inserted in this way.

As shown in FIG. 1, the jet nozzles 1–6 are spaced from one another and are aligned and arranged to discharge a transport fluid in the same direction to transport the weft thread 11. Each of the jet nozzles 1–6 may be constructed and mounted in a conventional manner, for example as shown in U.S. Pat. No. 3,465,791. For the transport of the weft 11 through the shed first the supply of the transport fluid, e.g. air, to the first jet nozzle 1 is opened, which jet nozzle thereby injects a conical jet of the transport fluid in the transport direction into the shed which jet takes along the weft 11 from the point 10 in its path in the direction of the next jet nozzle 2. It has been established that the weft 11 then lodges or "nestles" itself in the boundary layer forming around the conical core of the jet. Now the supply of the transport fluid to the jet nozzle 1 is continued up to a point in the weaving cycle just beyond the point at which the supply of the transport fluid to the second jet nozzle 2 is opened. The weft 11 is thereby taken over by the jet issuing from the jet nozzle 2 and taken along by the boundary layer forming around said jet in the direction of the third jet nozzle 3. The energization of the jet nozzle 2 is continued for a short time interval after the supply of the transport fluid to the third jet nozzle 3 is opened in order to thereby assure that the weft 11 is with certainty taken over by the jet issuing from the third jet nozzle 3. The jet issuing from the first jet nozzle 1 has been interrupted at that moment for a "long" time already.

FIG. 1 shows an instantaneous picture of the weft 11 during its transport through the shed. Especially this instantaneous picture relates to a point of time at which only the third jet nozzle 3 is operative and the front end of the weft 11 is moving in the direction of the jet nozzle 4 carried by the boundary layer around the conical jet issuing from the jet nozzle 3. At that point of time the previously actuated jet nozzles 1 and 2 have already been switched off, whereas the supply of transport fluid to the jet nozzles 4, 5 and 6 situated further in the weft direction has still to take place. The weft 11 extends from the launching point 10 to the origin of the transport jet issuing from the jet nozzle 3 at the considered point of time, according to a substantially straight line and extends from the said third jet origin according to a generatrix of the jet cone. Instead of the said straight course of the weft between the point 10 and the jet nozzle 3 a more serrated or sawtoothed course of the weft would be obtained, if the nozzles 1 and 2 would still be operating at the considered moment.

With the method according to the invention the weft 11 will therefore move along a more tautly extending path through the shed and therefore the possibility of contact with the upper warp sheet 7, the under warp sheet 8 or the reed 9 will be very small whereby the possibility is obtained to reduce the shed height correspondingly.

Figure 2:
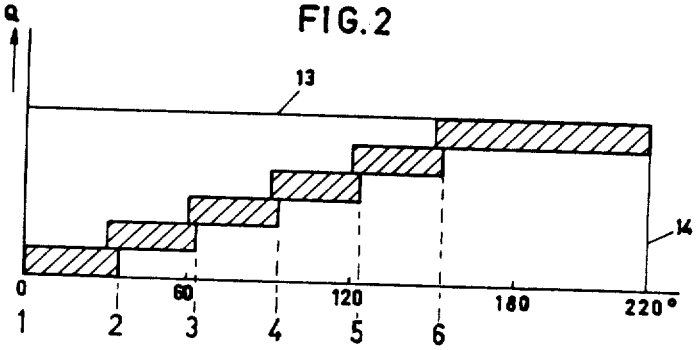
FIG. 2 shows a diagram in which the air consumption during a weaving cycle is registered and FIG. 3 shows a simplified scheme for controlling the supply to the successive jet nozzles.

It may be seen from the diagram of FIG. 2 what the air consumption is when applying the method according to the invention compared with the air consumption with the method applied heretofore. On the abscissa 220° of a weaving cycle of 360° have been drafted. In the first half of the weaving cycle from 0°–180° the transport of the thread 11 from the launching point 10 to the opposite side of the shed takes place, whereas in the second half of the weaving cycle, from 180°–360°, the reed 9 beats the inserted thread up into the cloth and returns to its starting position according to the drawing. FIG. 2 shows that the energizing of the jet nozzle 1 starts at 0° and ends at 33°, whereas the energizing of the second jet nozzle 2 starts at 30° and ends at 63° and so on. In the embodiment shown an overlap of 3° occurs between each two successive transport jets. The last jet nozzle 6 stays energized during 40° in the second half of the weaving cycle in order to keep the inserted weft taut during the beat up movement of the reed. The sum of the hatched areas in FIG. 2 is a measure for the air consumption during the weaving cycle. This air consumption has to be compared with the air consumption in a method in which all jet nozzles are supplied at the same time and during an equally long interval, which last mentioned air consumption may be reproduced by the area of the rectangle limited by the abscissa, the ordinate and the lines 13 and 14.

Figure 3:
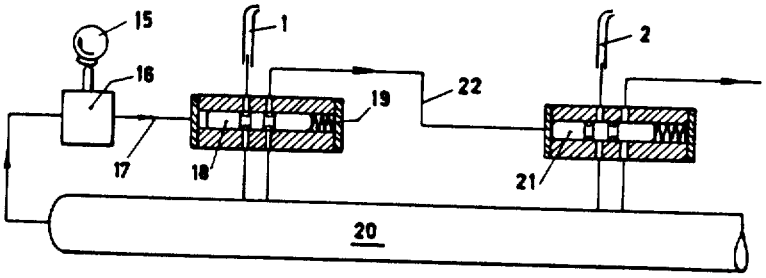

For the control of the supply of transport fluid to the successive jet nozzles 1–6 use may be made of separate valves inserted in the supply lines to the various jet nozzles which valves may be actuated by cams, mounted in phase-shifted relation on a common control shaft. Another control mechanism allowing higher weaving velocities is schematically shown in FIG. 3. Hereby a single control cam 15 is used which is driven by the operating mechanism of the loom so that it rotates once for each stroke of the reed 9. With each rotation of the cam 15, a weft thread 11 is launched into the shed as the cam 15 acts to keep open a valve pin 16 in a pilot air conduit 17 during a time interval corresponding to the supply time of the jet nozzle 1, in order to shift a control slide 18 against the action of a return spring 19, in a valve which belongs to the first jet nozzle 1 or to a first group of jet nozzles, to a position in which the jet nozzle 1 is in communication with a source 20 of transport fluid under pressure. At the same time the control slide 18 forms part of a pilot mechanism which connects the valve which supplies the jet nozzle 1 to the valve which supplies the jet nozzle 2. This pilot mechanism includes a conduit 22 and operates, during the period of energization of the jet nozzle 1, to connect the source 20 with a control slide 21 belonging to the second jet nozzle 2 or to a second group of jet nozzles. The conduit 22 between the control slide 18 and the control slide 21 is such that the pressure signal transmitted by the conduit 22 reaches the control slide 21 with a retardation corresponding to the desired time interval between the start of operation of the control slide 18 and the start of operation of the control slide 21. The control slide 21 will therefore connect the source 20 with the second jet nozzle 2 or the second group of jet nozzles only at a moment at which the first control slide 18 under the influence of the return spring 19 is about to return to its deenergized closed position. As indicated in FIG. 3, the control slide for each valve is connected to the succeeding control slide, to provide pilot mechanism which connects each succeeding valve to the preceding valve and which causes each valve to open momentarily, after the opening of a preceding valve. In this way, the mechanism illustrated in FIG. 3 causes each of the valves to be energized for the proper interval and in the proper sequence as shown in FIG. 2. It is clear that in this way a great many control slides, each belonging to a jet nozzle or a group of jet nozzles, may be placed in series.

It is to be noted that the supply of the transport fluid to the separate jet nozzles during the energization need not be constant, but may e.g. also be pulsating.

I claim:

1. A method of transporting a weft thread through a weaving shed by discharging *only* a [plurality] *single row* of aligned jets of transport fluid at points spaced along the *interior of the* shed, wherein the improvement comprises the steps of energizing the jets successively, in time with the advancement of the leading end of the weft thread, to cause the jets to entrain the leading end of the weft thread progressively and thereby draw the weft thread through the shed.

2. A method according to claim 1 comprising the steps of progressively reducing the amount of fluid discharged in the jets so that the flow of fluid in each jet is reduced as the leading end of the weft thread approaches a succeeding jet.

3. A method according to claim 2 wherein the reduction in the amount of fluid discharged in each jet is performed after a succeeding jet has been energized.

4. A method of transporting a weft thread through a weaving shed by discharging *only* a [plurality] *single row* of aligned jets of transport fluid at points spaced along the *interior of the* shed, wherein the improvement comprises the steps of progressively reducing the amount of fluid discharged in the jets so that the flow of fluid in each jet is reduced as the leading end of the weft thread approaches a succeeding jet.

5. Apparatus for transporting a weft thread through a weaving shed, including *only* a [plurality] *single row* of spaced aligned nozzles arranged *in the interior of the shed* to discharge a transport fluid in the same direction to transport a weft thread, wherein the improvement comprises mechanism which energizes the nozzles successively, in time with the advancement of the leading end of the weft thread, to cause the resulting jets to entrain the leading end of the weft thread progressively and thereby draw the weft thread through the shed.

6. Apparatus according to claim 5 wherein the improvement comprises mechanism which energizes the nozzles successively, in time with the advancement of the leading end of the weft thread, to cause the resulting jets to entrain the leading end of the weft thread progressively and thereby draw the weft thread through the shed and which progressively reduces the amount of fluid discharged from the nozzles so that the flow of fluid from each nozzle is reduced as the leading end of the weft thread approaches a succeeding nozzle.

7. Apparatus [according to claim 6] *for transporting a weft thread through a weaving shed, including a plurality of spaced aligned nozzles arranged to discharge a transport fluid in the same direction to transport a weft thread, wherein the improvement comprises mechanism which energizes the nozzles successively, in time with the advancement of the leading end of the weft thread, to cause the resulting jets to entrain the leading end of the weft thread progressively and thereby draw the weft thread through the shed and which progressively reduces the amount of fluid discharged from the nozzles so that the flow of fluid from each nozzle is reduced as the leading end of the weft thread approaches a succeeding nozzle, and* wherein the mechanism which energizes the nozzles comprises a source for supplying a transport fluid under pressure, a valve which connects each of the nozzles to such source, and pilot mechanism which connects each valve after the first valve to the valve for a preceding nozzle and which causes each valve to open momentarily, after the opening of the valve for such preceding nozzle.

8. Apparatus for transporting a weft thread through a weaving shed, including *only* a [plurality] *single row* of spaced aligned nozzles *in the interior of the shed* arranged to discharge a transport fluid in the same direction to transport a weft thread, wherein the improvement comprises mechanism which progressively reduces the amount of fluid discharged from the nozzles so that the flow of fluid from each nozzle is reduced as the leading end of the weft thread approaches a succeeding nozzle.

*9. Apparatus according to claim 6 wherein said nozzles are energized in successive groups and wherein a reduction in the amount of fluid discharged in each group of nozzles is performed after a succeeding group of nozzles has been energized.*

*10. A method of transporting a weft thread through a weaving shed by discharging, at points spaced along the interior of the shed, the jets of only a single row of aligned jets each directing a stream of air in a direction to convey a weft across the interior of the shed, wherein the improvement comprises the steps of energizing the jets successively in time with the advancement of the leading end of the weft thread to cause the jets progressively to entrain the leading end of the weft thread and thereby draw the weft thread through the shed and of progressively reducing the amount of air discharged in the jets so that the flow of air in each jet is reduced as the leading end of the weft thread approaches a succeeding jet which has been energized.*

*11. A method according to claim 10 wherein the flow of fluid in a group of jets is reduced as the leading end of the weft thread approaches a succeeding group of jets.*

*12. A method according to claim 10 wherein the jets are energized in successive groups and wherein a reduction in the amount of fluid discharged in each group of jets is performed after a succeeding group of jets has been energized.*

* * * * *